(12) United States Patent
Richardson

(10) Patent No.: US 7,042,615 B2
(45) Date of Patent: May 9, 2006

(54) ELECTROCHROMIC DEVICES BASED ON LITHIUM INSERTION

(75) Inventor: Thomas J. Richardson, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/441,855

(22) Filed: May 19, 2003

(65) Prior Publication Data

US 2004/0021921 A1   Feb. 5, 2004

Related U.S. Application Data

(60) Provisional application No. 60/381,389, filed on May 17, 2002.

(51) Int. Cl.
*G02F 1/15* (2006.01)

(52) U.S. Cl. .................. 359/265; 359/267; 359/270; 359/275

(58) Field of Classification Search ............... 359/265, 359/266, 267, 268, 269, 270, 271, 272, 273, 359/274, 275; 252/582, 586
See application file for complete search history.

(56) References Cited

U.S. PATENT DOCUMENTS

| | | | |
|---|---|---|---|
| 3,521,941 A | 7/1970 | Deb et al. | |
| 4,139,275 A | 2/1979 | Yano et al. | |
| 4,293,194 A | 10/1981 | Takahashi | |
| 4,375,319 A | 3/1983 | Wada et al. | |
| 4,421,985 A | 12/1983 | Billingsley et al. | |
| 4,524,385 A | 6/1985 | Billingsley et al. | |
| 4,830,471 A | 5/1989 | Demiryont | |
| 4,960,324 A | 10/1990 | Brown | |
| 5,066,111 A | 11/1991 | Singleton et al. | |
| 5,124,832 A | 6/1992 | Greenberg et al. | |
| 5,164,855 A | 11/1992 | Buffat et al. | |
| 5,177,628 A | 1/1993 | Moddel | |
| 5,209,980 A | 5/1993 | Spindler | |
| 5,215,821 A | 6/1993 | Ho | |
| 5,260,821 A | 11/1993 | Chu et al. | |
| 5,327,281 A | 7/1994 | Cogan et al. | |
| 5,471,338 A | 11/1995 | Yu et al. | |
| 5,471,554 A | 11/1995 | Rukavina et al. | |
| 5,514,496 A * | 5/1996 | Mishima et al. | ............ 429/338 |
| 5,520,851 A | 5/1996 | Yu et al. | |
| 5,532,869 A | 7/1996 | Goldner et al. | |
| 5,585,959 A | 12/1996 | Brown et al. | |
| 5,598,293 A | 1/1997 | Green | |
| 5,618,390 A | 4/1997 | Yu et al. | |
| 5,635,729 A | 6/1997 | Griessen et al. | |
| 5,657,150 A | 8/1997 | Kallman et al. | |
| 5,721,633 A | 2/1998 | Nagai et al. | |
| 5,777,780 A | 7/1998 | Terada et al. | |
| 5,793,518 A | 8/1998 | Lefrou et al. | |

(Continued)

OTHER PUBLICATIONS

PCT published application WO 00/17706 Mar. 30, 2000.

(Continued)

*Primary Examiner*—Hung Dang
*Assistant Examiner*—Tuyen Tra
(74) *Attorney, Agent, or Firm*—Fulbright & Jaworski L.L.P.

(57) ABSTRACT

Electrochromic devices having as an active electrode materials comprising Sb, Bi, Si, Ge, Sn, Te, N, P, As, Ga, In, Al, C, Pb, I and chalcogenides are disclosed. The addition of other metals, i.e. Ag and Cu to the active electrode further enhances performance.

15 Claims, 9 Drawing Sheets

```
14
```

| 15 | GLASS |
|---|---|
| 16 | TCO |
| 17 | COUNTER ELECTRODE |
| 18 | ELECTROLYTE (LiPON, etc) |
| 19 | ACTIVE ELECTRODE (TiS, etc.) |
| 20 | TCO |
| 21 | GLASS |

U.S. PATENT DOCUMENTS

| | | | |
|---|---|---|---|
| 5,798,860 A | 8/1998 | Yu et al. |
| 5,831,760 A | 11/1998 | Hashimoto et al. |
| 5,849,415 A | 12/1998 | Shalaby et al. |
| 5,905,590 A | 5/1999 | Van Der Sluis et al. |
| 5,916,398 A | 6/1999 | Coleman et al. |
| 5,953,150 A | 9/1999 | Smarto et al. |
| 5,969,847 A | 10/1999 | Coleman et al. |
| 5,970,187 A | 10/1999 | Notten et al. |
| 5,973,818 A | 10/1999 | Sjursen et al. |
| 5,973,819 A | 10/1999 | Pletcher et al. |
| 5,978,126 A | 11/1999 | Sjursen |
| 5,995,273 A | 11/1999 | Chandrasekhar |
| 6,006,582 A | 12/1999 | Bhandari et al. |
| 6,010,220 A | 1/2000 | Smarto |
| 6,033,518 A | 3/2000 | Backfisch |
| 6,039,850 A | 3/2000 | Schulz |
| 6,047,107 A | 4/2000 | Roozeboom |
| 6,066,269 A | 5/2000 | Wei et al. |
| 6,067,184 A | 5/2000 | Bonhote et al. |
| 6,091,184 A | 7/2000 | De Vries |
| 6,094,292 A | 7/2000 | Goldner et al. |
| 6,099,117 A | 8/2000 | Gregory |
| 6,101,298 A | 8/2000 | Den Broeder et al. |
| 6,110,016 A | 8/2000 | Coleman et al. |
| 6,118,572 A | 9/2000 | Kostecki et al. |
| 6,120,696 A | 9/2000 | Armand et al. |
| 6,127,516 A | 10/2000 | Bard et al. |
| 6,136,161 A | 10/2000 | Yu et al. |
| 6,163,926 A | 12/2000 | Watanabe |
| 6,165,547 A | 12/2000 | Leedom |
| 6,165,643 A | 12/2000 | Doyle et al. |
| 6,166,849 A | 12/2000 | Coleman et al. |
| 6,173,116 B1 | 1/2001 | Roozeboom et al. |
| 6,177,130 B1 | 1/2001 | Frey |
| 6,185,034 B1 | 2/2001 | Nakamura et al. |
| 6,198,225 B1 | 3/2001 | Kano et al. |
| 6,211,995 B1 | 4/2001 | Azens et al. |
| 6,213,602 B1 | 4/2001 | Smarto |
| 6,232,782 B1 | 5/2001 | Kacprowicz et al. |
| 6,241,261 B1 | 6/2001 | Smarto et al. |
| 6,259,549 B1 | 7/2001 | Leupolz et al. |
| 6,265,222 B1 | 7/2001 | DiMeo et al. |
| 6,291,096 B1 | 9/2001 | Klein |
| 6,310,725 B1 | 10/2001 | Duine et al. |
| 6,317,531 B1 | 11/2001 | Chen et al. |
| 6,356,376 B1 | 3/2002 | Tonar et al. |
| 6,383,956 B1 | 5/2002 | Hawryluk et al. |
| 6,395,350 B1 | 5/2002 | Balkus et al. |
| 6,420,071 B1 | 7/2002 | Lee et al. |
| 6,437,900 B1 | 8/2002 | Cornelissen et al. |
| 6,495,390 B1 | 12/2002 | Hawryluk et al. |
| 6,608,713 B1 | 8/2003 | Ouwerkerk et al. |
| 6,620,342 B1 * | 9/2003 | Burchill et al. ............ 252/511 |
| 6,815,122 B1 * | 11/2004 | Barker et al. ............ 429/231.9 |
| 6,844,115 B1 * | 1/2005 | Gan et al. ................ 429/332 |
| 2002/0154535 A1 | 10/2002 | Bocian et al. |
| 2002/0160270 A1 | 10/2002 | Bronstert et al. |

OTHER PUBLICATIONS

Acrivos et al. "Optical studies of metal-semicoductor transmutations produced by intercalation" Letters to the Editor, Journal of Physics C, Solid State Physics, vol. 4, 1971, pp. L18-L20.

* cited by examiner

ELECTROCHROMIC DEVICES BASED ON LITHIUM INSERTION

CROSS REFERENCE TO RELATED APPLICATIONS

This application claims priority to U.S. Ser. No. 60/381,389, filed May 17, 2002, the contents of which are hereby incorporated by reference in their entirety.

STATEMENT REGARDING FEDERALLY SPONSORED RESEARCH OR DEVELOPMENT

The invention described and claimed herein was made in part utilizing funds supplied by the United States Department of Energy under contract No. DE-AC03-76SF000-98 between the U.S. Department of Energy and The Regents of the University of California. The government has certain rights to the invention.

BACKGROUND OF THE INVENTION

Electrochromism is a term used to describe a reversible change of color exhibited by some materials when placed in an electric field. In general, electrochromic materials are substances whose optical properties can be reversibly altered through application of an electric current. Some materials can exhibit a mirror-like state when no electric field is present, and change to a transparent state when an electric field is applied, and vice versa. Devices capable of switching between mirror-like and transparent states find many applications in architectural and transportation energy conservation, lighting and displays, aerospace insulation control, and optical communications systems. Such devices, termed "switchable mirrors", based on rare earth hydrides were discovered by Huiberts et al., Nature 380, 231 (1996), who observed a reversible metal-to-insulator transition when a thin film (150 to 500 nm) of yttrium or lanthanum coated with a thin layer of palladium was exposed to hydrogen gas. The transition accompanies conversion of a metallic dihydride phase to a semiconducting trihydride. Rare earth-magnesium alloy films were subsequently found to be superior to the pure lanthanides in maximum transparency and mirror-state reflectivity, see Van der Sluis et al., Appl. Phys. Lett. 70, 3356 (1997).

Variable reflectance coatings (switchable mirrors) have significant advantages over traditional absorbing devices for radiant energy control in a variety of architectural and aerospace applications due to their large dynamic ranges in both transmission and reflection in the visible and near infrared regimes. Although electrochromic and gasochromic metal hydride films have been the primary focus of recent developments in this field, the instant invention contemplates electrochromic devices using materials other than the known metal hydrides.

BRIEF SUMMARY OF THE INVENTION

A new class of switchable mirrors or electrochromic devices based on novel electrochromic materials has been discovered and described herein. The rapid, reversible conversion from the highly reflecting metallic state to a transparent semiconducting state contemplated by this invention is produced by electrochromic means.

The current inventor is also the inventor of U.S. Ser. No. 09/901,969, filed Jul. 9, 2001, currently pending, the contents of which are incorporated by reference in its entirety. This prior application discloses the use of metal hydrides in electrochromic devices. In one embodiment of the instant invention is based on electrochemical conversion of pnicogens to lithium pnictides. Metallic thin films of elemental metals or semi-metals are reversibly converted to transparent, semiconducting lithium compounds by cathodic polarization in a non-aqueous lithium electrolyte. Like the metal hydrides, these systems provide substantial modulation of visible and near infrared transmission and reflection, but have somewhat lower visible reflectance in their mirror states. In another embodiment, the instant invention teaches the intercalation compounds of Li with transition metal chalcogenides.

Although the metal hydride-based mirrors of the prior art have attractive properties, they suffer from poor cycle life due to the reactive nature of the metal film, which is readily attacked by air or water. Water is one component of the electrolyte in electrochromic hydride mirrors, and may be produced during the removal of hydrogen from the mirror film in both electrochromic and gasochromic devices. Currently, this degradation is inhibited by the use of additional barrier layers to protect the active materials and by sealing devices to prevent access of environmental air and water. The former is difficult to achieve and may not be effective for long periods of use. The latter does not address the problem of internal sources of water or oxygen.

The instant invention attempts to solve the problems of the prior art. One solution is to use the materials of the active electrode of the instant invention in an electrochromic device to achieve the switching. Films in electrochromic devices described herein undergo a reversible reaction that does not involve hydrogen, but another electrochemically active species, such as lithium or other alkali metal or alkaline earth metal. This invention contemplates several metals and semimetals that form semiconducting, transparent lithium compounds, including Sb, Bi, Si, Ge, Sn, Te, N, P, As, Ga, In, Al, C, Pb, I, and their compounds with each other. In addition, this invention contemplates the use in electrochromic devices of semiconducting solids that become metallic upon lithium insertion or intercalation. These include carbon and chalcogenides such as sulfides, e.g. $TiS_2$, selenides, e.g. $NbSe_2$, and tellurides, e.g. $NbTe_2$.

DETAILED DESCRIPTION OF THE PREFERRED EMBODIMENTS

Figure 1:
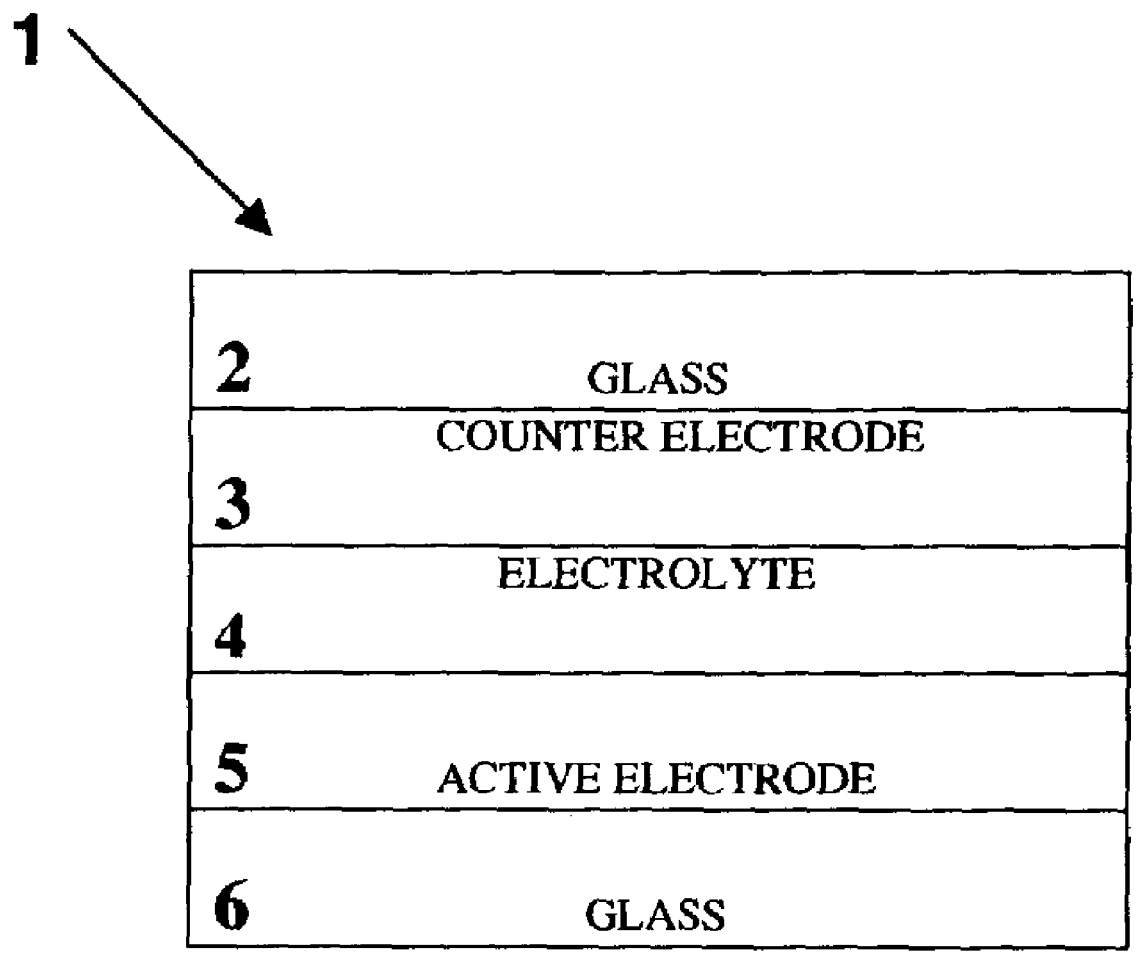
FIG. 1 shows a diagram of an electrochromic device according to one embodiment of this invention.

This invention contemplates electrochromic devices that will optically switch upon the application of electric current. As used herein the term "switching device" is meant to include a device capable of exhibiting a change of light transmission or reflection in response to an applied electric field. A "switching film" is a film of materials described herein that undergo a reversible change in light transmittance or reflectance.

An electrochromic device contemplated by this invention can be produced to appear in its transparent, uncolored state (enabling one to see through the device), or in its mirror-like state, or in its colored, absorbing state. The general structure and architecture of electrochromic devices suitable for use with this invention are well known. Devices suitable for use with this invention include, but are not limited to, those devices disclosed in the following U.S. Pat. Nos., the contents of which are hereby incorporated by reference in their entirety: U.S. Pat. Nos. 6,211,995; 6,094,292; 5,970,187; 5,831,760; 5,793,518; 5,777,780; 5,532,869; 4,830,471 and 4,293,194.

The invention described herein exhibits reversible color changes on application of electric current. Thin films of these materials are suitable for optical switching elements, thin film displays, sunroofs, rear-view mirrors, and architectural materials, which include but are not limited to roofs and glasses.

As used herein "first row transition metals" include Sc, Ti, V, Cr, Mn, Fe, Co, Ni, Cu and Zn. "Second row transition metals" include Y, Zr, Nb, Mo, Tc, Ru, Rh, Pd, Ag and Cd. "Third row transition metals" include La, Hf, Ta, W, Re, Os, Ir, Pt, Au and Hg.

As used herein the term "pnicogens" includes N, P, As, Sb and Bi.

As used herein the term "chalcogenides" includes the Group 7A elements O, S, Se, Te.

By "alkali metals" it is meant to include Li, Na, K, Rb, Cs or Fr.

By "alkaline earth metals" it is meant to include Be, Mg, Ca, Sr, Ba and Ra.

By "metallic and semimetallic materials" it is meant to include the present pnicogens, as well as silicon and germanium, tellurium and iodine, transition metal chalcogenides such as titanium disulfide and niobium selenide, and graphitic carbon. When carbon is used herein as a switching material herein it is meant to mean graphitic carbon.

Films operating via lithium ion insertion have been characterized, see Granqvist, C. G., *Handbook of Inorganic Electrochromic Materials*, Elsevier, Amsterdam (1995), the contents of which are hereby incorporated by reference to the extent that it pertains to Li compounds. The instant invention contemplates that the optical properties of metallic and semimetallic materials can be changed by addition or removal of lithium, and thus this invention contemplates their use in thin films in switching devices. The preparation and characterization of these materials can be found, for example in A. R. Beal, S. Nulsen, *Phil. Mag.* B 43 (1981) 965 for ($TiS_2$) and J. V. Acrivos, C. Delios, N. Y. Topsoe, J. R. Salem, *J. Phys.* C 3 (1971) L18 for ($NbSe_2$ and the intercalated $NaNbSe_2$). The contents of these references are incorporated by reference in their entirety for all purposes. U.S. Pat. No. 6,094,292 discloses electrochromic devices using Li. The contents of this reference are hereby incorporated by reference in its entirety.

The electrochemistries of the lithium-antimony and lithium-bismuth systems have been studied by Huggins and co-workers, see for example W. Weppner et al., *J. Electrochem. Soc.* 124 (1977) 1569; W. Weppner et al., *J. Solid State Chem.* 22 (1977) 297; W. Weppner et al., *J. Electrochem. Soc.* 125 (1978) 7 and J. Wang et al., *J. Electrochem. Soc.* 133 (1986) 457. The contents of these references are incorporated by reference in their entirety for all purposes. While most of this work was carried out at elevated temperatures, where the formation of the metallic intermediates $Li_2Sb$ and LiBi are more easily distinguished, the interconversion of Sb and Bi to $Li_3Sb$ and $Li_3Bi$ are facile at room temperature. High lithium ion conductivities were observed in $Li_3Sb$ and $Li_3Bi$, with considerable thermodynamic enhancement in the latter phase due to the existence of a range of stoichiometry between about $Li_{2.83}Bi$ and $Li_{3.05}Bi$. A much smaller stoichiometric range was found for $Li_3Sb$. Both compounds are known to be semiconductors, with a reported bandgap of 3.9 eV for $Li_3Sb$ and a calculated gap of 2.2 eV for $Li_3Bi$.

Electrochromic devices disclosed herein may be made according to techniques generally known in the art or disclosed in U.S. Pat. No. 5,171,413, the contents of which are hereby incorporated by reference in their entirety. When a potential is applied sufficient to cause electrons to flow into the active, metallic layer, lithium ions are also taken up causing formation of a new compound which is not metallic, but transparent. The transition may be stopped or reversed at any stage to achieve a desired level of transparency or reflectivity. The optical properties of this phase may also be variable. It may exhibit, as in the case of bismuth, transparency, and electrochromism, changing color as the amount of lithium is varied.

FIG. 1 shows a diagram of an electrochromic device (1) in accordance with one embodiment of this invention. In one embodiment the active electrode (5) is a thin, continuous film of an active material with a high electronic conductivity. It may be in contact with a non-aqueous electrolyte (4), such as lithium perchlorate in propylene carbonate, which is unreactive toward the electrode layer and is capable of supplying lithium ions for insertion in the electrode. A counter electrode (3), which may be optically active or passive, supplies lithium ions to the electrolyte to maintain the charge balance. This invention contemplates that sodium or other alkali or alkaline earth ions may be substituted for lithium. The electrolyte may be a liquid, a solid or a polymer. In a preferred embodiment, the electrolyte is a solid. A counter electrode supplies positive ions and may be transparent, opaque, reflecting, or actively electrochromic, depending upon the desired application.

In the case of active electrodes of this invention, particularly for Sb and Bi, the potential for lithium insertion is so low that the TCO would be damaged, and therefore, the conductivity of the $Li_xSb$ layer itself carries the current on that side. It is possible to use an intermediate $Li_xSiC$ layer, U.S. Pat. No. 5,532,869 (the contents of which are hereby incorporated by reference in its entirety) to protect the TCO from reaction with lithium.

Electrochromic devices contemplated by this invention use novel switching layers and function in at least four different ways, depending on the architecture of the device. In one embodiment, a reflecting/transmitting device (a window) that has an active layer that operates at a potential compatible with some transparent conducting layer (oxide or non-oxide). In this embodiment there is a transparent conductor between the glass and the active electrode.

In another embodiment, a reflecting/transmitting device (a window) is contemplated that has an active layer that operates at a potential NOT compatible with known transparent conducting layers. In this device the active film itself will transport current across the window. The distance it has to travel can be reduced by, for example, coating the glass with a thin grid of metal or carbon lines so that they carry the current to parts of the device distant from the edges. These might be visible up close but not noticeable at a distance.

In another embodiment, an absorbing/reflecting device is contemplated in which the active electrode is at the backside. Here, the counter electrode is transparent and requires a transparent conductor layer, but the active electrode does not. It can be deposited on an absorbing conductor, which could be a metal or carbon or other absorbing substrate. The light passes through the counter electrode first, then the electrolyte, then hits the active electrode and is either reflected or not depending on the potential of the device.

In another embodiment, an absorbing/reflecting device in which the active electrode is at the front side. Here the light hits the active electrode first and is reflected or not. If not, some may be absorbed by the active layer, some by the electrolyte, some by the counter electrode, some by the current collector for the counter electrode (which could be the substrate).

Figure 2A:
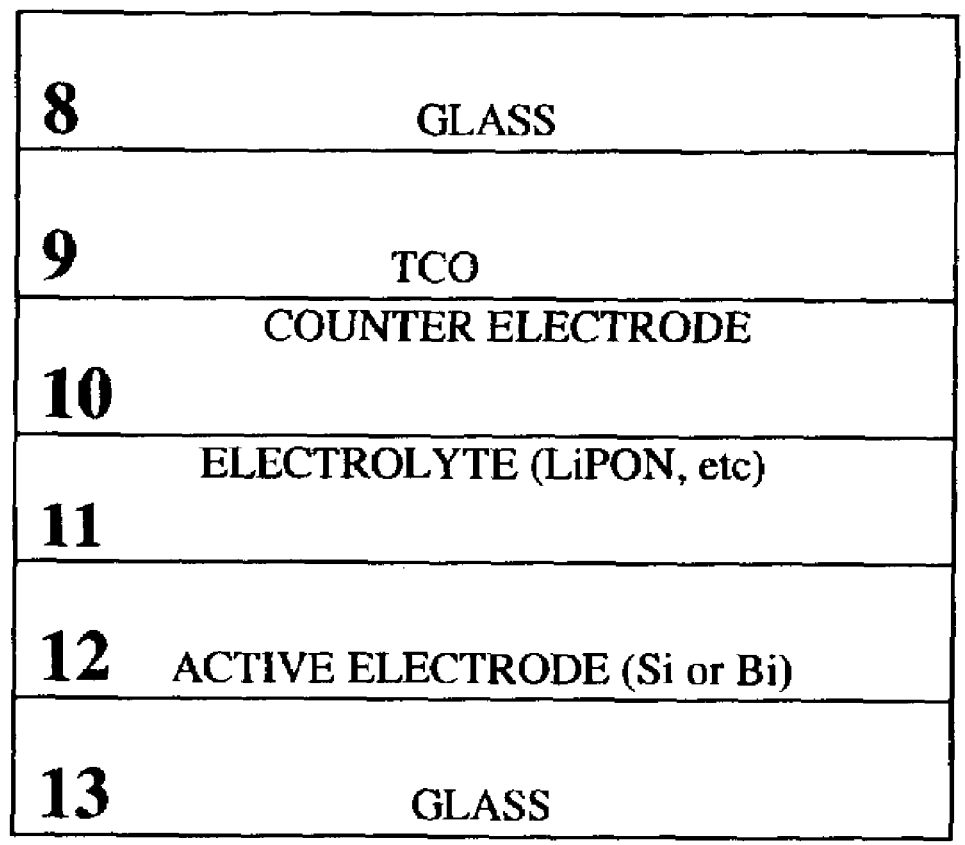
FIG. 2a shows a diagram of an electrochromic device according to one preferred embodiment of this invention.

Materials suitable for the active electrode comprise at least one element chosen from the group consisting of Sb, Bi, Si, Ge, Sn, Te, N, P, As, Ga, In, Al, C, Pb, I, and chalcogenides, particularly transition metal chalcogenides, which are preferred in combination with a TCO. FIG. 2a shows a diagram of an electrochromic device (7) in one preferred embodiment of this invention that Sb and/or Bi be used in a glass (13)/active electrode (12)/solid electrolyte (11) (i.e., LiPON, lithium silicate, solid polymer or gel)/counter electrode (10)/TCO (9)/glass (8).

Figure 2B:
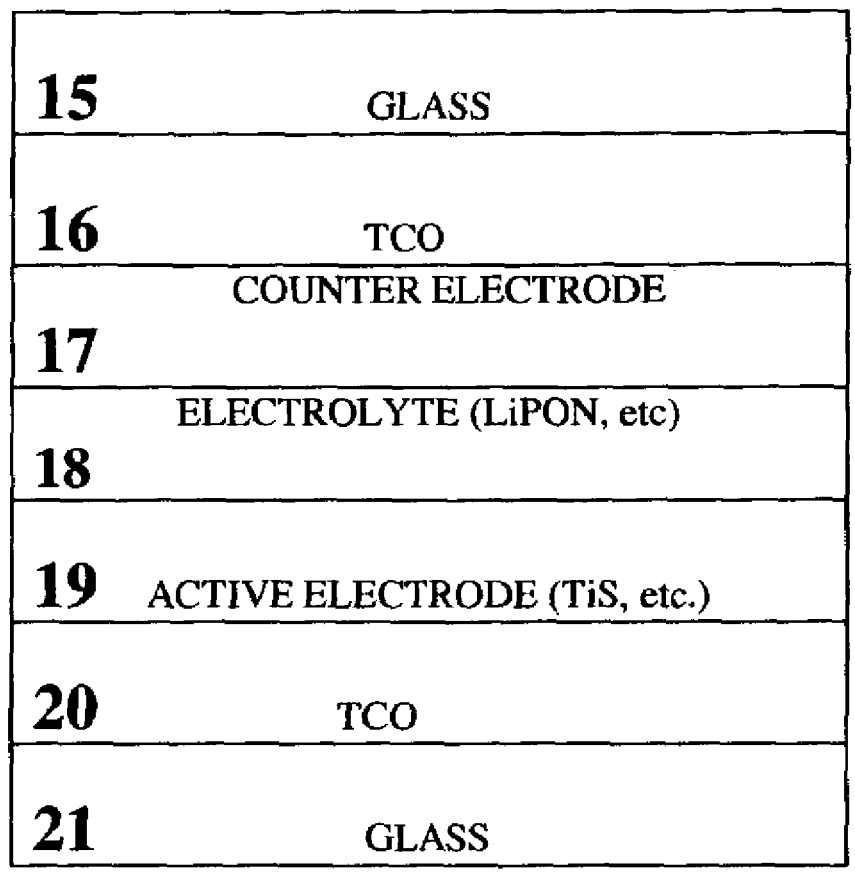
FIG. 2b shows a diagram of an electrochromic device according to another preferred embodiment of this invention.

Other active electrode materials are the metal chalcogenides such as $TiS_2$, selenides, e.g. $NbSe_2$, and tellurides, e.g. $NbTe_2$. FIG. 2b shows a diagram for another preferred embodiment of an electrochromic device (14) employing $TiS_2$ (19) or other active electrode that is compatible with a TCO, glass (21)/TCO (20)/active electrode (19) ($TiS_2$)/solid electrolyte (18) (LiPON lithium silicate, solid polymer or gel)/counter electrode (17)/TCO (16)/glass (15).

Ion blocking layers may be used between either electrode and a TCO.

The instant invention contemplates that active electrode material layers can be enhanced by the addition of other metals; particularly Ag and Cu. Ag and Cu have been added as intimate mixtures in amounts of from about 12 wt % to about 50 wt % with improved performance of resulting devices. Electrochromic cycling speed and stability of the switching films were improved by the addition of copper and silver. It is not clear how exactly the incorporation of metals improves the performance. While not wishing to be bound by any particular theory or principle it is possible that the metals may be incorporated in the lithiated phase in place of lithium, as $Li_2MSb$, for example, where M=Cu or Ag. This would reduce the amount of lithium required for switching and the corresponding volume expansion. Even if the metals do not participate in the reaction, they may increase the electronic conductivity of the film in the semiconducting state and/or provide a network of conduction paths to regions far from the current collector. Further, the presence of the added metal as an alloy, as a substituent in lithiated phases or as a separate phase may alter the optical properties of the films in both mirror and transparent states.

Addition is contemplated by those techniques known in the art. In this invention addition was accomplished by sputtering with separate targets.

Materials suitable for transparent counter electrodes and solid state, polymer, and gel electrolytes are well developed for devices contemplated for use with this invention. Passive electrodes include vanadium, titanium, cerium and the rare earth oxides, their mixtures with each other and with other elements. Active electrodes include tungsten, nickel and niobium oxides and their mixtures with other elements. Counter electrodes materials for non-transparent devices include the above listed counter electrode materials in addition to all of the active materials listed in this invention that reversibly takes up lithium, such as cobalt, nickel and magnesium oxides.

The transparent conducting oxide layer (TCO) is a transparent current collector. It is usually tin-doped indium oxide (ITO) or fluorine-doped tin oxide (FTO). These are commercially available and suitable for use with oxide electrochromic layers, for example a counter electrode, $Li_xV_2O_5$, contemplated by one embodiment of this invention. It would be required for any transparent oxide counter electrode. A TCO not be necessary for an absorbing/reflecting device, which does not require transparency. Then, any non-reactive metal would be suitable as a current collector.

Any suitable transparent substrate material may be utilized in the instant invention. Tempered or untempered window glass, high silica glasses, optical glasses, specialty glasses, optically transparent ceramics and optically transparent polymers or plastics are suitable.

In one embodiment electrochromic devices according to the instant invention were made using lithium vanadium oxide, $Li_xV_2O_5$ as a counter electrode, where 0<x<1. This is a transparent, slightly electrochromic material. This material is known and techniques for applying the material to optical quality substrates are disclosed in U.S. Pat. No. 6,177,130, the contents of which are incorporated herein by reference in its entirety.

A Li compound of the instant invention may be deposited on a glass substrate by vacuum sputtering. The active electrode film may be 5 to 5000 nm thick; preferably the film is 20–50 nm. An advantage to the invention described herein is that no Pd layer need be applied compared to previous electrochromic mirror devices. The counter electrode may be any thickness that provided sufficient capacity to switch the optically active electrode, and this may be up to 10,000 nm, preferably about 200 nm.

DC magnetron sputtering is a suitable deposition method for most types of metals. Other variants of sputtering will also produce similar results, such as rf sputtering, ac sputtering, plasma-assisted sputtering. Evaporation methods also will produce films of the required properties. It is contemplated that sputtering from a single target with mixed reactants is also suitable. Any form of film deposition should be suitable for the formation of electrochromic films of the materials described herein. CVD or electrodeposition are also suitable candidates.

Films made of the materials described herein may also contain concentration gradients, and are so contemplated depending on their desired end use. For example it is contemplated that gradients in film thickness normal to the film surface be present so as to isolate the switching compounds from the surface. Films of the materials described herein may comprise two or more thin films of said materials. The materials may be doped with up to a few atom percent of another element to affect the color or electrical conductivity of the resulting device.

EXAMPLE 1

Antimony and bismuth lithium compositions were deposited on glass substrates by evaporation of the metals in a vacuum coater. Film thicknesses were measured by profilometry (Dektak). Electrochemical cycling was carried out in a 50 mL fused silica cuvette containing 1 M $LiClO_4$ in propylene carbonate, using lithium foil counter and reference electrodes. Photopic transmittance was monitored in situ using a filtered silicon detector (International Light, Inc.) with output coupled to a computerized potentiostat/galvanostat (Arbin, Inc.). Visible spectra were recorded using a fiber optic spectrometer (Ocean Optics, Inc.). X-ray diffraction (XRD) patterns of films as deposited and after cycling were obtained using a Siemens thin film diffractometer with an incident beam angle of 0.5° from the sample surface.

Figure 3:
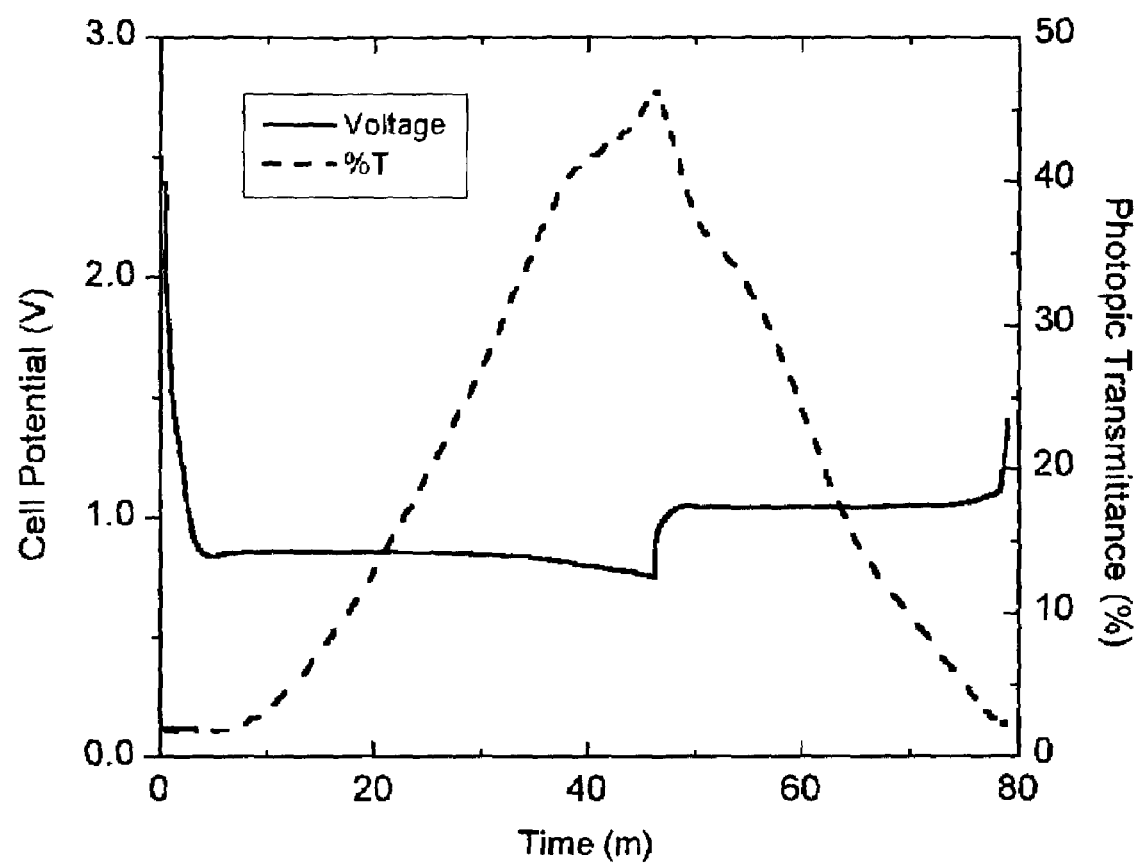
FIG. 3 shows a cell potential and photopic transmittance vs. time for a 25 nm thick Sb film during lithium insertion and extraction. Current density: 20 $\mu A/cm^2$.
Figure 4:
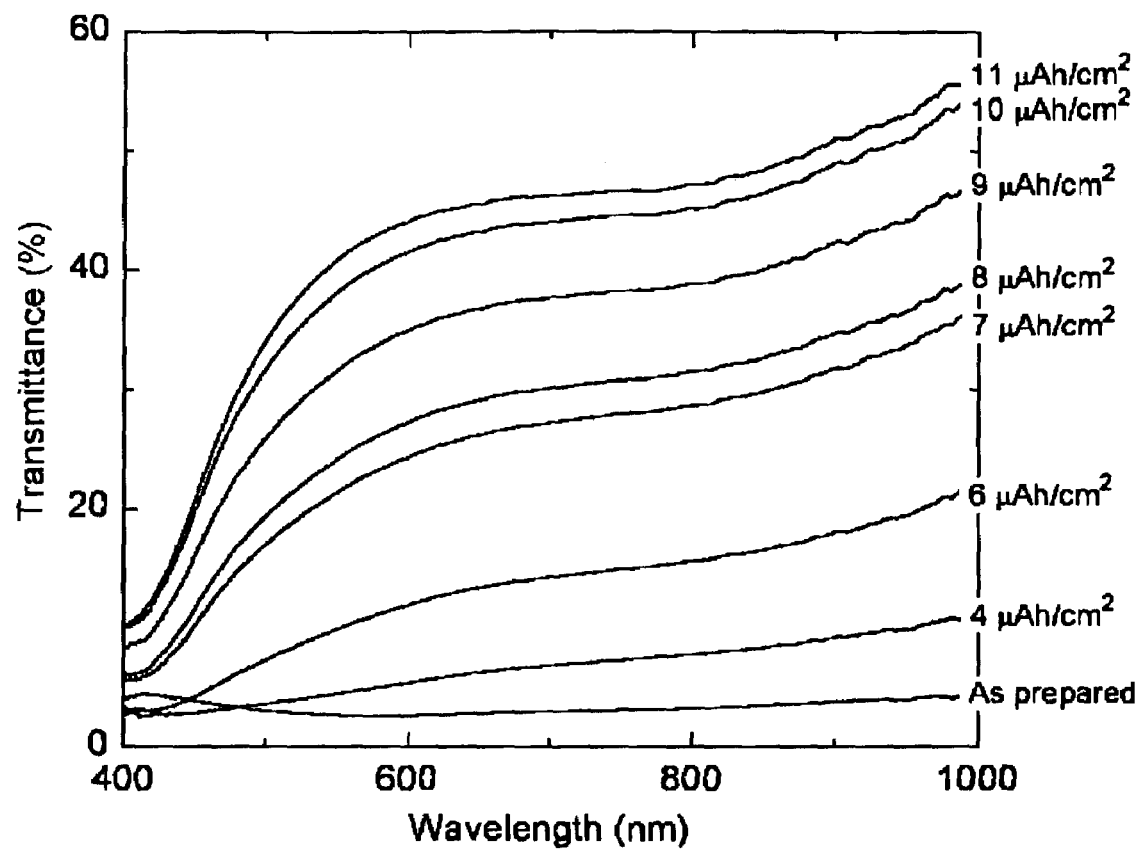
FIG. 4 shows a visible-NIR transmission spectrum of a 25 nm thick Sb film during lithium insertion.

The potential of a fresh antimony film is about 2.5 V vs. Li due to the presence of a small amount of oxide. As lithium is taken up, the potential drops rapidly to a plateau at about 0.8 V (FIG. 3). The current is carried entirely by the antimony film. Because the formation potentials of $Li_2Sb$ and $Li_3Sb$ are very similar, only the latter is observed during lithiation. Near the end of lithiation, the drop in potential is gradual due to migration of lithium into the portion of the film which is not wetted by the electrolyte. This also results in a slower bleaching of the film in this region, and a larger discharge capacity. The lithium is removed at about 1.1 V, showing that $Li_3Sb$ retains sufficient conductivity to facilitate the reversion to the metal phase, and that the metallic and semiconducting portions of the film maintain contact despite the thickness change during cycling. The charge passed on oxidation of the film corresponds closely to 3 electrons per Sb atom in the wetted portion of the film. The changes in the visible-NIR transmission spectrum (FIG. 4) also suggest formation of the transparent $Li_3Sb$ throughout the bleaching process, rather than formation of a metallic intermediate. Repeated cycling between the metallic and transparent states resulted in gradual coarsening of the Sb grains, a lessened specular appearance in the metallic state, and a slow deterioration in the dynamic range, while the reversible capacity remained constant.

Figure 5:
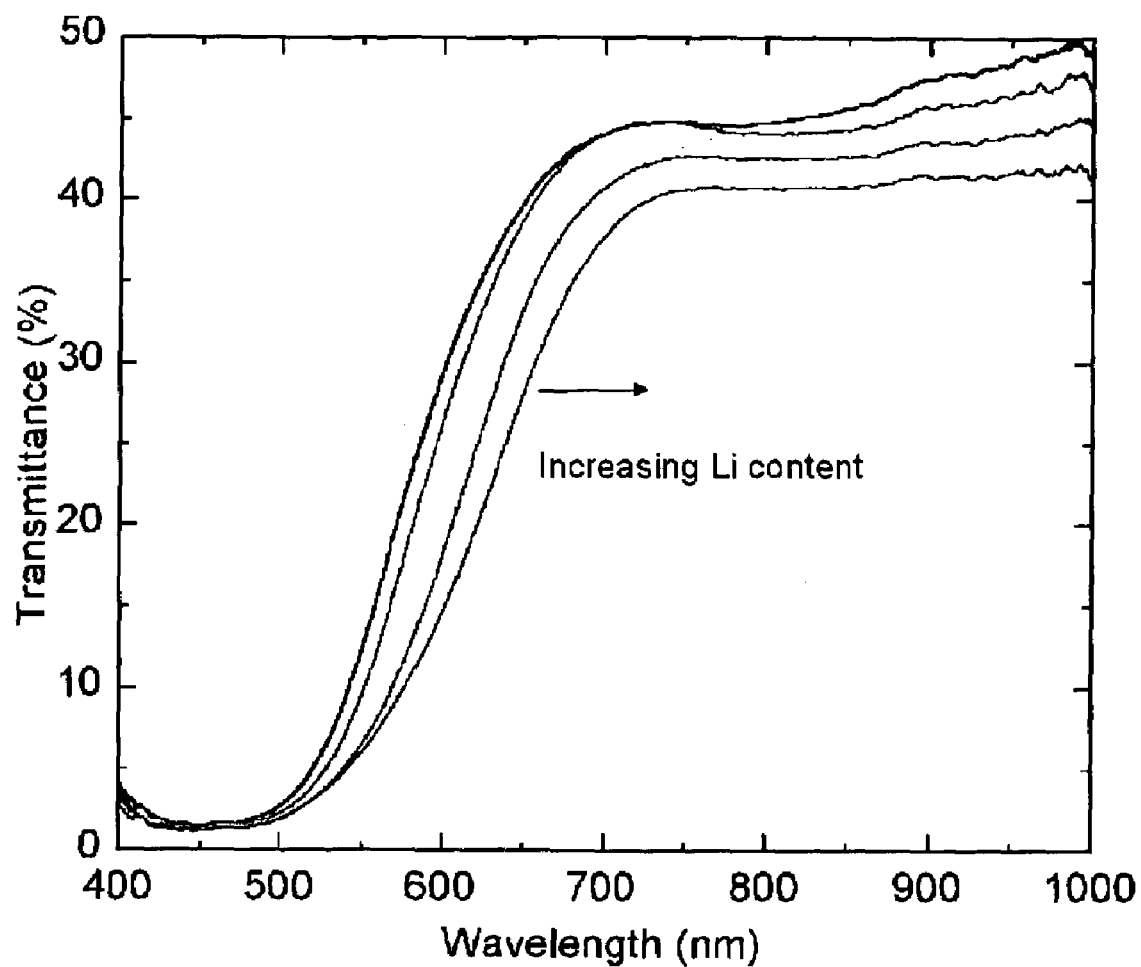
FIG. 5 shows the shifting of the absorption edge with excess lithium in a 30 nm thick $Li_{-3}Bi$ film.
Figure 6:
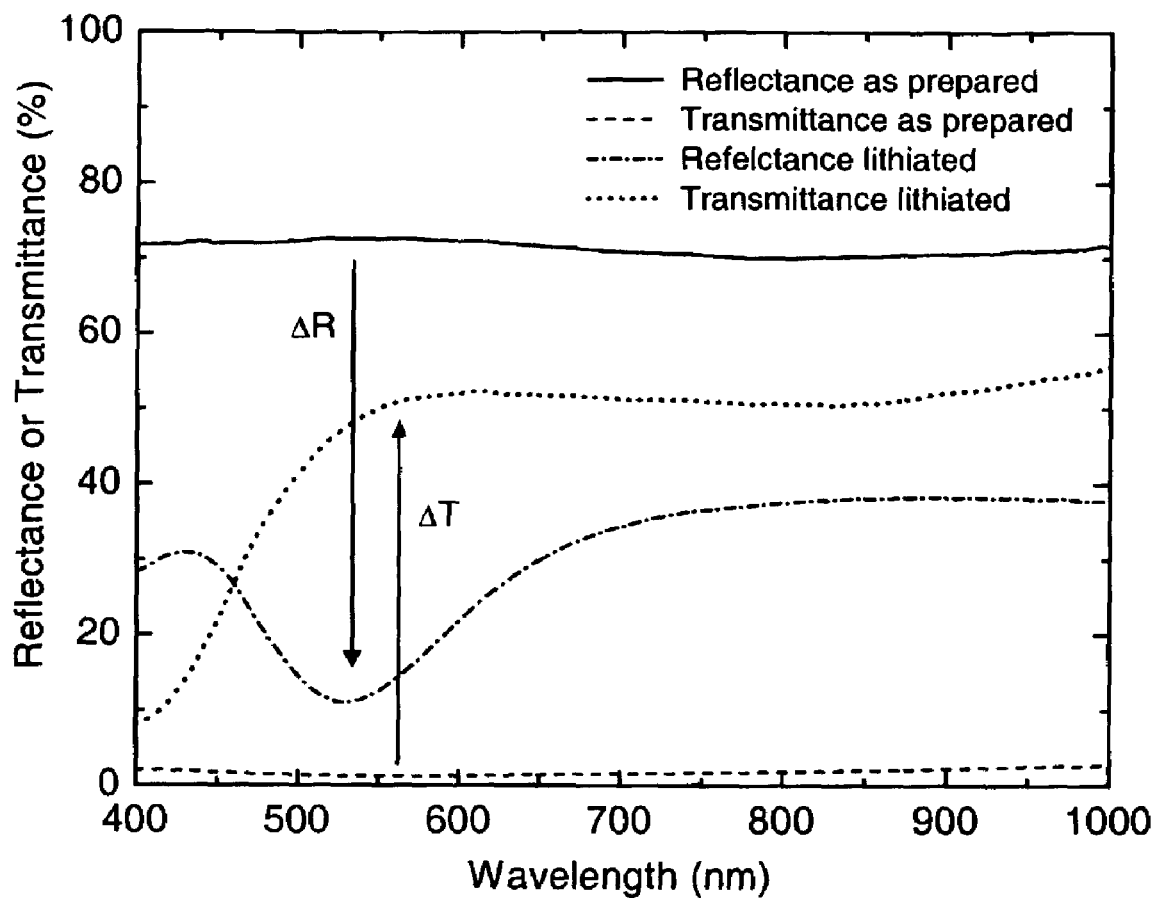
FIG. 6 shows the visible-NIR reflectance and transmittance spectra of a pure Sb film before and after lithiation
Figure 7A:
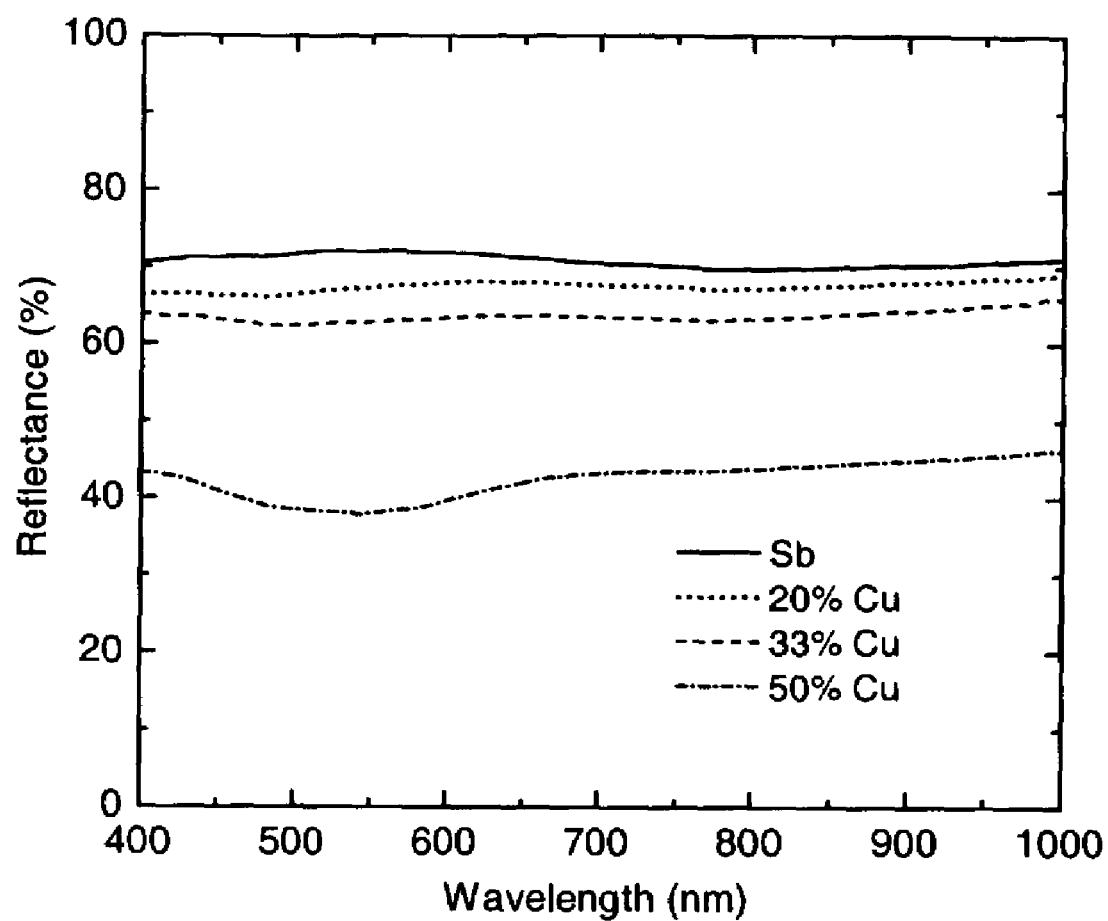
FIG. 7a shows the reflectance spectra of a Sb—Cu thin film.
Figure 7B:
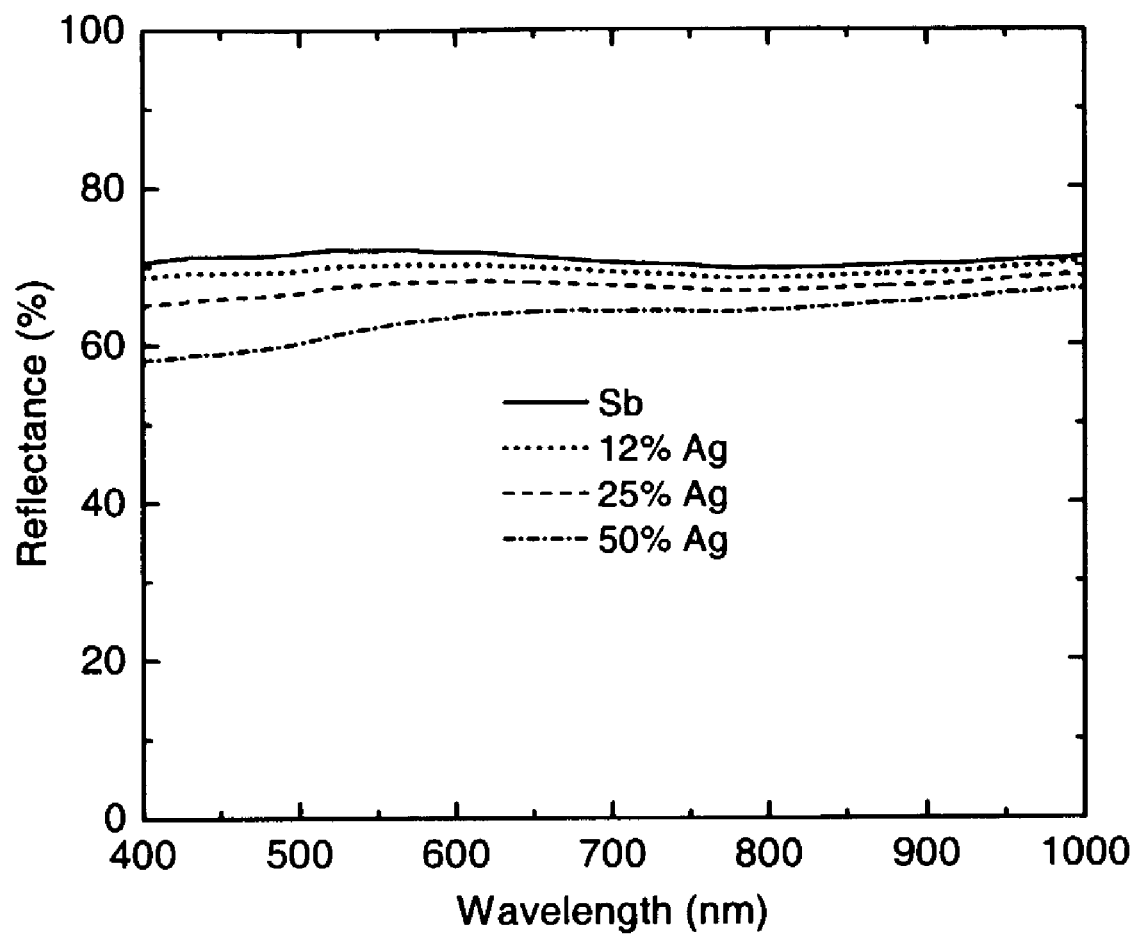
FIG. 7b shows the reflectance spectra of a Sb—Ag thin film.

The behavior of bismuth is quite similar to that of antimony, except that after the pale yellow state is achieved, further insertion of lithium results in a strong electrochromism within the transparent phase, with a dramatic shift in the absorption edge for small increments of excess lithium (FIG. 5). The precise composition was not established, but the range of excess lithium beyond the state of maximum transparency is about 0.1 per Bi atom. Switching in this range was very stable, with no deterioration over hundreds of cycles.

Metallic thin films of elemental antimony and bismuth, deposited on glass substrates by vacuum evaporation, are reversibly converted to transparent, semiconducting lithium pnictides by cathodic polarization in a non-aqueous lithium electrolyte. Dramatic changes in transmission and reflection accompany the phase transitions, which are reversible and can be used as the basis of a switchable mirror system. The estimated optical bandgaps of the yellow semiconducting phases $Li_3Sb$ and $Li_3Bi$ are about 3.1 and 3.5 eV, respectively. Varying the lithium content in a narrow region of non-stoichiometry in $Li_{3\pm x}Bi$ produces a reversible color change from yellow $Li_{-3}Bi$ to red $Li_{-3.1}Bi$ due to a shift in the absorption edge, which results in modulation of the photopic (visible) transmittance by a factor of three for a film with an initial thickness of 25 nm.

EXAMPLE 2

Pure Sb, Cu—Sb, and Ag—Sb films were deposited on 25 mm×37 mm glass substrates by DC magnetron sputtering from separate 2" diameter targets at 26° off normal, target to substrate distance: 90 mm. Film thicknesses (Table I) were measured by stylus profilometry (Dektak). Electrochemical cycling was carried out in a 50 mL fused silica cuvette containing 1 M $LiClO_4$ in propylene carbonate, using lithium foil counter and reference electrodes. Photopic transmittance was monitored in situ using a filtered silicon detector (International Light, Inc.) with output coupled to a computerized potentiostat/galvanostat (Arbin, Inc.). Visible spectra were recorded using a fiber optic spectrometer (Ocean Optics, Inc.).

TABLE I

Film Deposition Conditions and Thicknesses

| % Cu | % Ag | Sb Power (W) | Cu/Ag Power (W) | Deposition Time (s) | Thickness (nm) |
|---|---|---|---|---|---|
| 0 | 0 | 29 |  | 60 | 20 |
| 20 |  | 28 | 5 | 70 | 28 |
| 33 |  | 32 | 16 | 64 | 31 |
| 50 |  | 23 | 24 | 60 | 25 |
|  | 12 | 28 | 4 | 60 | 28 |
|  | 25 | 27 | 10 | 60 | 20 |
|  | 50 | 20 | 22 | 60 | 40 |

The visible reflectance of the mixed metal films was somewhat lower than that of pure Sb especially for Cu addition. The photopic transmittance of films after deposition was below 2% at all visible wavelengths. An area of about 5 $cm^2$ of each film was immersed in the electrolyte and loaded with lithium at a constant current of 10 $\mu A/cm_2$.

Addition of 20% Cu had little effect on the capacity for lithium and only a slight lowering of the extraction potential from 1.07 to 1.03 V. 33% Cu, however, reduced the amount of lithium required for conversion to the maximum transmitting state by more than half, although a lower potential limit was required to achieve full lithiation via a multi-step reaction process. Lithium extraction also took place in several steps, with the bulk occurring at about 1.05 V. Despite the dramatic effect on the electrochemical behavior, the optical switching of the 33% Cu film was similar to that of pure Sb except that two steps are discernable here as well. During the first, corresponding to the sloping plateau above 0.8 V, there was a gradual increase in transmittance with little change in the shape of the spectrum, with an absorption edge about 100 nm higher and transmittance about two-thirds that of the fully-lithiated Sb. During the lower potential insertion, the increase in transmittance was accompanied by a shift of the absorption edge to shorter wavelengths by more than 50 nm, and development of a region of very high transmittance around 600 nm. Increasing the Cu content to 50% substantially reduced the transmission in the lithiated state.

12% Ag substitution produced a slightly increased lithiation potential and a small reduction in capacity, while the lithium extraction overpotential was almost completely eliminated. The effect on the transmittance spectrum was similar to that for Cu substitution, shifting the absorption edge to longer wavelengths while increasing the maximum transmittance. At 25% Ag, multi-step lithiation was evident, while lithium extraction proceeded in an apparently single-step reaction. Again, the lithium capacity was largely unaffected. For 50% Ag, two distinct steps appeared for both lithiation and delithiation, a much lower potential limit was required for complete switching, the capacity decreased by 25%.

Given sufficient activation energy, the intermetallics $Cu_2Sb$ and $Ag_3Sb$ could be expected to form in co-sputtered Cu—Sb and Ag—Sb films, respectively. In the absence of substrate heating, which was not employed here, alloying of the metals was not, however, assured. Incorporation of the metal substituent into phases formed during lithiation may also occur. In heavily substituted films, multi-stage lithiation and delithiation was apparent for both Cu and Ag. The electrochemical and optical behaviors of the mixed metal films were consistent with the formation of phases that include the substituents at least during the final stages of lithiation.

It will be appreciated by those skilled in the art that various modifications and extrapolations can be made in the process, compositions and articles as described herein without departing from the spirit and scope of the invention. All references cited above are hereby incorporated by reference in their entirety into the instant specification.

What is claimed is:

1. A switching device capable of undergoing a reversible change in light transmittance or reflectance, comprising:
    a counter electrode, an electrolyte layer and an active electrode, wherein:
    said electrolyte layer is disposed between the counter electrode and the active electrode, said electrolyte layer comprising either an alkali or alkaline earth metal ion; and
    said active electrode comprises at least one element chosen from the group consisting of Sb, Bi, Si, Ge, Sn, Te, N, P, As, Ga, In, Al, C, Pb and I, and wherein upon the application of a current to the switching device, a compound comprising at least either an alkali or alkaline earth metal ion and an element of the active electrode is formed as part of the active electrode.

2. The switching device as claimed in claim 1, wherein the alkali metal ion is Li.

3. The switching device as claimed in claim 2, wherein upon the application of a current to the switching device, the compound formed is selected from the group consisting of $Li_2Sb$, $Li_3Sb$, $Li_2Bi$ and $Li_3Bi$.

4. The switching device as claimed in either of claims 1, 2 or 3, further comprising:
    a glass layer and a transparent conducting oxide layer disposed between the glass layer and the counter electrode.

5. The switching device as claimed in claim 1, wherein:
    the active electrode comprises either Ag or Cu in an amount of from about 1 wt % to about 70 wt %.

6. The switching device as claimed in claim 1, wherein:
    the active electrode comprises either Ag or Cu in an amount of from about 12 wt % to about 50 wt %.

7. The switching device as claimed in claim 1, wherein:
    the active electrode consists essentially of at least one element chosen from the group consisting of Sb, Bi, Si, Ge, Sn, Te, N, P, As, Ga, In, Al, C, Pb, I and alloys thereof.

8. A switching device capable of undergoing a reversible change in light transmittance or reflectance, comprising:
    a counter electrode, an electrolyte layer and an active electrode, wherein:
    said electrolyte layer is disposed between the counter electrode and the active electrode, said electrolyte layer comprising either an alkali or alkaline earth metal ion; and
    said active electrode comprises a transition metal chalcogenide, and wherein upon the application of a current to the switching device, a compound comprising at least either an alkali or alkaline earth metal ion and the transition metal chalcogenide of the active electrode is formed as part of the active electrode.

9. The switching device as claimed in claim 8, wherein the electrolyte layer comprises Li ions.

10. The switching device as claimed in either of claims 8 or 9, further comprising:
    a glass layer and a transparent conducting oxide layer disposed between the glass layer and the active electrode.

11. The switching device as claimed in claim 8, wherein:
    the active electrode comprises a compound chosen from the group consisting of $TiS_2$, $NbSe_2$, and $NbTe_2$.

12. The switching device as claimed in claim 8, wherein:
    the active electrode comprises either Ag or Cu in an amount of from about 1 wt % to about 70 wt %.

13. The switching device as claimed in claim 8, wherein:
    the active electrode comprises either Ag or Cu in an amount of from about 12 wt % to about 50 wt %.

14. The switching device as claimed in claim 8, wherein:
    the active electrode consists essentially of transition metal chalcogenide and alloys thereof.

15. The switching device as claimed in claim 14, wherein:
    the active electrode consists essentially of a compound chosen from the group consisting of $TiS_2$, $NbSe_2$, and $NbTe_2$.

* * * * *